United States Patent [19]
Trainer

[11] Patent Number: 5,432,942
[45] Date of Patent: Jul. 11, 1995

[54] DATA STRUCTURE EXTRACTION, CONVERSION AND DISPLAY TOOL

[75] Inventor: Joshua P. Trainer, North Kingstown, R.I.

[73] Assignee: The United States of America as represented by the Secretary of the Navy, Washington, D.C.

[21] Appl. No.: 74,514

[22] Filed: Jun. 10, 1993

[51] Int. Cl.⁶ .............................................. G06F 11/00
[52] U.S. Cl. ............................ 395/700; 364/DIG. 1; 364/264; 364/280.4; 364/286; 364/286.3
[58] Field of Search ................................ 395/700, 650

[56] References Cited
PUBLICATIONS

Landis, et al., "Documentation in a Software Maintenance Environment", Technical Solutions, Inc, 1988.

*Primary Examiner*—Kevin A. Kriess
*Assistant Examiner*—Jonathan Hall Backenstose
*Attorney, Agent, or Firm*—Michael J. McGowan; Prithvi C. Lall; Michael F. Oglo

[57] ABSTRACT

The present invention relates to a tool, in the form of a computer program, for analyzing computer programs by extracting and converting information about data structures in the program, storing the information about the extracted data structures in a series of random access files forming a relational database, and displaying the stored information as desired. The method for analyzing the computer program using the tool of the present invention includes the steps of inputting a computer program to be analyzed, extracting and converting at least one data structure such as a variable or a table from the program, storing information about the data structure(s) in one or more random access files, and displaying the stored information in either a textual or graphical mode. The program to be analyzed is preferably inputted into the program of the present invention in the form of one or more source code files. It has been found to be successfully applied to the analysis of source code files written in programming language Compiler Monitor System Version 2Y (CMS-2Y), which is commonly used in military application.

1 Claim, 4 Drawing Sheets

Initialize   Display   Print   Status   Edit   Exit
─────────────── Record Contents Screen ───────────────

TABLE name: CSTSEX
Type: H
No of items: MAXNTGSS
No of words: 7

COMMENTS: CSTS EXTENSION

| SUBFIELD NAME | TYPE | SIZE | SIGN | FRACTIONAL BITS | START WORD | START BIT |
|---|---|---|---|---|---|---|
| RNGRATE | A | 16 | S | 8 | 0 | 31 |
| TURNAMT | A | 16 | S | 15 | 0 | 15 |
| TURNAMTB | A | 16 | U | 16 | 0 | 15 |
| EUA | A | 16 | S | 15 | 1 | 31 |
| DE | A | 16 | U | 16 | 1 | 31 |
| UCRR | A | 16 | S | 8 | 1 | 15 |
| DISPHIST | B | | | | 2 | 0 |
| OPTURN | B | | | | 2 | 1 |
| ZIGZAG | B | | | | 2 | 2 |
| PIDEQUL | B | | | | 2 | 3 |

There are more subfields in this table, hit any key to continue....

FIG-3

```
Initialize    Display    Print    Status    Edit    EXit
              ———— Record Contents Screen ————

TABLE name:  CSTSEX
Type:        H
No of items: MAXNTGSS
No of words: 7

COMMENTS: CSTS EXTENSION
                                        ┌──────── Subfield Description ────────┐
                                        │                  CSWITCHS :          │
SUBFIELD                                │ Subfield:        TURNAMTB            │
NAME       TYPE  SIZE  SIG              │ Type:            A                   │
========== ===== ===== ===              │ Size:            16                  │
RNGRATE    A     16    S                │ Sign:            U                   │
TURNAMT    A     16    S                │ Fract. Bits:     16                  │
TURNAMTB   A     16    U                │ Starting Word:   0                   │
EUA        A     16    S                │ Starting Bit:    15                  │
DE         A     16    U                │                                      │
UCRR       A     16    S                │ COMMENTS:                            │
DISPHIST   B                            │         TURN AMT IN BAMS             │
OPTURN     B                            │                                      │
ZIGZAG     B                            │                                      │
PIDEQUL    B                            │ Hit any key to continue....          │
                                        └──────────────────────────────────────┘

End of: CSTSEX          Hit 'F'wd, 'B'ckwd, 'S'el, 'I'nfo, 'P'rint or e'X'it...
```

DATA STRUCTURE EXTRACTION, CONVERSION AND DISPLAY TOOL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a computer aided tool for analyzing a computer program and more particularly, to a method for extracting, converting and displaying complex software data structures located within existing computer programs.

2. Description of the Prior Art

As those skilled in the art well know, computer or software programs are rarely created in a single session. Often, many rewrites of a program are needed to get it to operate as desired. Additionally, complex or large scale programs are often written by more than one author and contain millions of lines of source code. This source code represents the complete architecture and functionality of the program.

After a software program has been certified or approved, it is deployed as a component part of a system. Thereafter, it needs to be maintained and upgraded during the life of the system. Life cycle deployments of both a program and a system can exceed twenty years.

Computer programmers that are tasked with the maintenance and upgrading of these systems often must rely on paper documentation that is in some cases decades old. Given the extremely large size of deployed software systems, documentation limitations can place great demands on the resources of a software maintenance organization. More specifically, current maintenance programming environments typically face the following problems. There are instances where the documentation for the software system is non-existent or misleading. Programmers must locate language constructs, such as data structures, from literally millions of lines of code, before they can debug and perform program maintenance. These problems force programmers to have years of direct experience with the particular software system being maintained to exhibit any appreciable efficiency.

A variety of tools have been developed to assist programmers in finding and debugging errors in computer programs and in understanding the structure of such programs. U.S. Pat. No. 5,029,170 to Hansen, for example, illustrates a tool for identifying potential Assembly language source code errors resulting from incorrectly used symbolic and literal address constructs. The tool comprises a debugging program which has an awareness of the specific machine interfaces, conventions and symbol sets. By essentially stepping through the Assembly language statements, the debugging program is able to identify, in the Assembly language program under study, specific instances of the use of statements containing possibly incorrect symbolic or literal address constructs and to run closely related additional tests. The programmer can then examine the denoted Assembly language code to determine if a genuine error exists. Use of this debugging program however requires execution of the computer program during analysis.

U.S. Pat. No. 4,730,315 to Saito et al. illustrates a tool for testing a program in a data processing system equipped with a display terminal for interactive operations. Program specification inputs are given in a diagrammatic form through interactive operations and are edited into diagrammatic specifications. The diagrammatic specifications are then translated into a source program in which are interspersed comment statements, each of which indicates a diagrammatic specification corresponding to the associated statement of the source program. In the course of the test, the diagrammatic specification corresponding to a process under execution is retrieved and displayed according to a comment statement and the portions corresponding to executed operations are displayed while the resultant values of variables are also displayed. One of the limitations to this test program is that it requires modification or enhancement of the original computer program and recompilation prior to its use. Other limitations are that this tool does not provide a graphical representation of the data structures as they are stored in memory and that it requires operation of the program under test.

U.S. Pat. No. 5,034,899 to Schult illustrates a software process for automatically generating a functional diagram graphic which can be used for automatically generating functional diagrams from a control program for a stored-program control system on a graphical display device, particularly a programming device for such a control system. The functional diagrams generated have a high information density. They contain signal branchings and signal crossings and function blocks with several outputs further connected to other function blocks.

Still another tool available to programmers is illustrated in U.S. Pat. No. 4,937,740 to Agarwal et al. This tool comprises a software analysis system for acquiring, storing, and analyzing certain predetermined characteristics of a computer program and includes a method for acquiring certain lines of high-level language instruction code without the need for statistical sampling. Each line of instruction code generates at least one address in assembly language which is encoded with a tag and stored in a first-in, first-out memory. The memory output is asynchronous with its output such that tagged addresses are stored in real time but extracted from memory at a predetermined rate. This allows the system to acquire all software events of interest. Each tagged address is also marked with a time stamp so that the time between acquisition of each of the software events of interest may be analyzed to determined the length of time spent in a particular subroutine. Typically, this system is used to evaluate the frequency of computer memory accesses made and to assess the performance of the software article under evaluation. One of the limitations of this tool is that it requires execution of the program under analysis on the target host computer.

Recently issued U.S. Pat. No. 5,185,867 to Ito illustrates an information processing system for generating software specifications to facilitate software maintenance work. The method involved in this system comprises the steps of reading information described in at least one software product obtained by particularizing a high rank specification, extracting information taken over from the high rank specification to the low rank specifications out of the information thus read, dividing the extracted information into common items and items single existing and relating to the common items, putting together singly existing items for every common item, arranging respective items on the basis of the information put together for every common item in a network form, generating network information, converting representation format of each item of the network information, and generating a high rank specification.

SUMMARY OF THE INVENTION

Despite the existence of these software tools, there still remains a need for a tool that provides powerful data structure extraction, conversion and analysis capability. Accordingly, it is an object of the present invention to provide a tool that provides powerful data structure extraction, conversion and analysis capability.

It is a further object of the present invention to provide a tool as above which allows data structure information and conversion status information to be stored in random-access files for subsequent display processing.

It is yet a further object of the present invention to provide a tool as above which eliminates the labor intensive process of manually searching for data structure information, interpreting the information and sketching the architecture of the data storage provided in the operational computer.

It is yet another object of the present invention to provide a tool as above that can process very large quantities of computer software.

Still further objects and advantages of the present invention will become apparent from the following description and accompanying drawings wherein like reference numerals depict like elements.

The foregoing objects and advantages are attained by the present invention which comprises a computer aided tool for the extraction, conversion and display of complex software data structures located within existing programs. The engineering analysis tool of the present invention has particular utility with large programs used in military applications.

The computer aided tool of the present invention comprises a computer program for analyzing another computer program. Typically, the program to be analyzed will be in the form of one or more source code files. The method for analyzing a computer program using the tool of the present invention broadly comprises: inputting a computer program to be analyzed, extracting and converting information about at least one data structure from the program and storing the information in at least one random access file. The method further comprises displaying the information stored in said at least one random access file in a desired format.

In a preferred embodiment of the present invention, the program to be analyzed is inputted in the form of one or more source code files. The source code files are read and parsed to find variable and table data structures taking into account compiler switches (C-switches). Information about variable structures in the program are extracted and converted to a desired form and then stored in a random access variable file. Information about table structures in the program and the field structure of the table(s) are extracted and converted to a desired form and then stored in random access table and field files. Still further, inline comments about the variable and table structures are identified and stored in a random access comments file. Additionally, a random access status file is maintained which contains information about the number of extracted variables, tables, fields and comments.

The information contained in the aforesaid random access files may be retrieved by a programmer as desired and displayed either in graphical or textual form or subsequent operator analysis.

Other details of the analysis tool of the present invention are set out in the following detailed description.

DETAILED DESCRIPTION OF THE PREFERRED EMBODIMENT

The software tool to be described hereinafter provides a powerful data structure extraction, conversion and analysis capability for programmers. The software tool comprises a program which can be written in any desired programming language such as "C" programming language. Additionally, the software tool can be run on any properly configured computer. The tool is comprised of a single executable program coupled with a text file used for the built-in context sensitive help feature. The software can run on any IBM/PC compatible that has an Enhanced Graphics Adapter (EGA) and monitor.

Illustrative of the type of source code for which the present invention has special utility is military standard programming language CMS-2Y (Compiler Monitor System Version 2Y) which is characterized by fixed syntax of language constructs, and which employs so-called "compiler switches" (C-switches) to effect conditional compilations.

Figure 1:
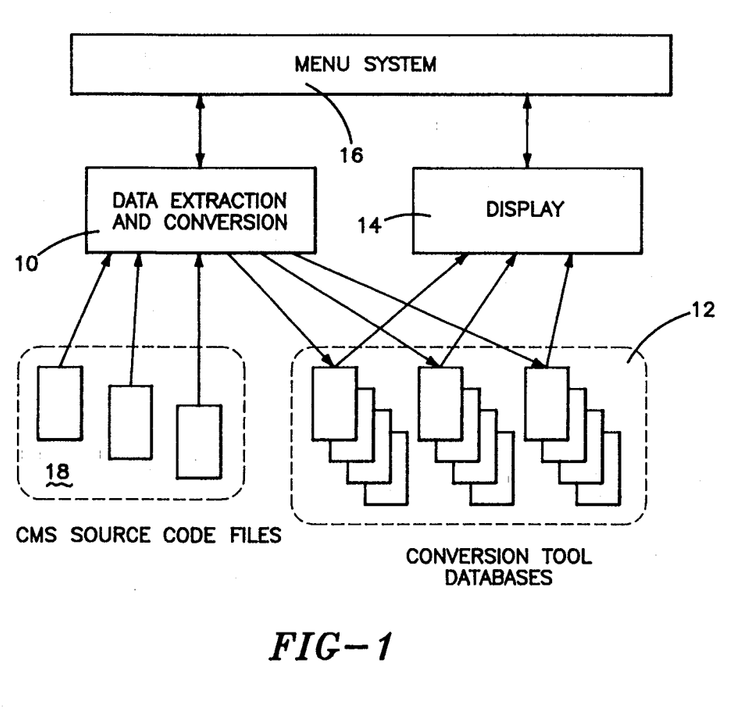
FIG. 1 is a schematic representation of the architecture of the software program forming the computer aided tool of the present invention.

At the top level, the architecture of the program of the present invention is partitioned into three functional areas as illustrated in FIG. 1. The first is the extraction and conversion segment 10, which is the portion responsible for the parsing of the input source code and the conversion and storage of data structure information into a relational database 12. The second segment is a display segment 14 which provides for data structure selection and display. The third segment is a menu-driven, windowed interface 16 for the display and control of the program.

The extraction and conversion segment 10 performs a one-time processing of the source code file(s) 18. It is executed once for each source code file to be analyzed, preferably prior to visualizing the data structures within the display segment 14. Once a source file 18 has been processed by the extraction and conversion segment, the display segment 14 can be used as often as desired.

Figure 2:
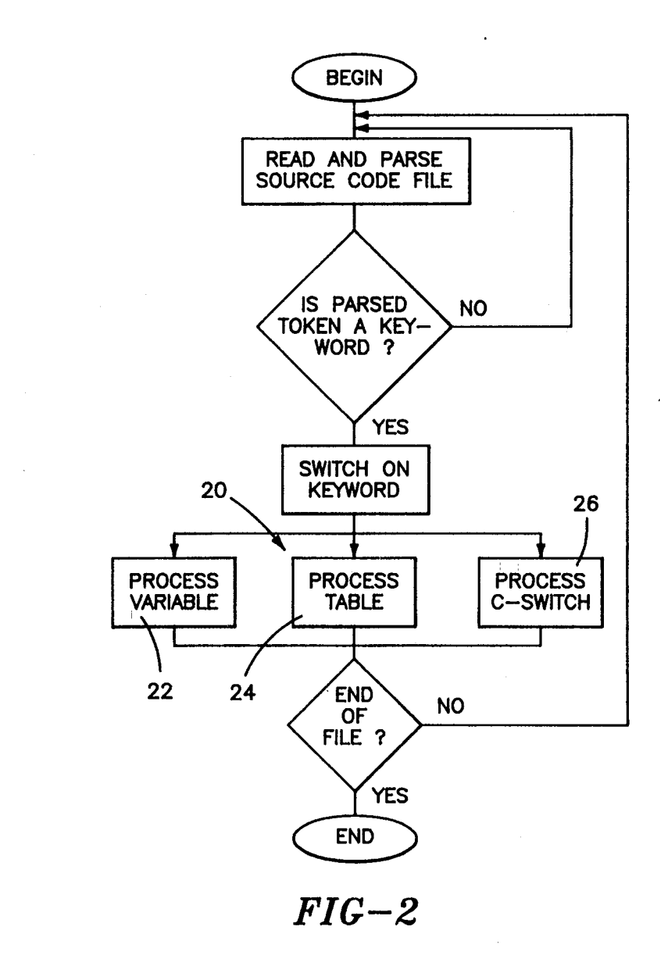
FIG. 2 is a flow-chart illustrating the processing in the extraction and conversion segment of the program of the present invention.

FIG. 2 outlines the top level processing in the extraction and conversion segment 10. It illustrates that the program of the present invention first reads and parses (interprets) a source code file 18 and determines if a parsed token (each separable word) is a recognized keyword. If a keyword is recognized, the program switches to a processing section 20, comprising process variable 22 and process table 24, that performs subsequent extraction and conversion of the appropriate data. Each of the extraction routines shown in blocks 22 and 24 takes advantage of the fixed syntax of the language constructs required by the compiler associated with the program under analysis and extracts the pertinent information defining the data structure of a variable or a table. An additional routine 26 is provided that accounts for compiler switches (C-switches). The C-switches are used by the or concomitantly with such analysis and extraction monitors states of the compiler switches for operational status of the source code file sections, compiler to effect conditional compilation of the source code and alternately switch on or off identified source code file sections. They must be accounted for in order to provide accurate representation of the data structures.

For illustrative purposes, it can be assumed that the source code under analysis is CMS-2Y and that the code utilizes the keyword "VRBL" in conjunction with certain variable data structures. Once this keyword is identified, the process variable function in block 22 is executed. This portion of the extraction and conversion process reads the name, data type, size, and sign attributes of the variable defined in the source code. Additionally, if there are any inline comments for the defined variable, that information is extracted as well. Examples of some variable definitions that can be found in a typical source code file are shown below in Table I:

TABLE I

| VRBL | NAVFLAGA I 32 S P O   | "NAVSAT FLAG            | "$ |
| ---- | --------------------- | ----------------------- | -- |
| VRBL | SCRUDANG A 32 S 31 P O | "RUDDER ANGLE IN BAMS   | "$ |
| VRBL | SCSTNPLN A 32 S 31 P O | "STERN PLANE ANGLE IN BAMS | '$ |
| VRBL | SCSFTRPM A 32 S 6 P O  | "SHAFT RPM (REV/MIN)    | "$ |

The interpretation of the input code for variables is based upon the fixed syntax of the language of the compiler. As shown in Table I, the variable definitions include a number of tokens. Preferably, only the following formal constructs or tokens are interpreted:

(a) The syntax of the compiler is such that the first token after the keyword VRBL is a character string identifying the variable name e.g. NAVFLAGA;

(b) The next token is a single character identifying the data type of the structure to be created (I=integer or A=real);

(c) The next token is an integer that represents the size of the variable in bits;

(d) The next token is a single character that identifies the sign of the variable (U=unsigned, S=signed); and (e) The interpretation of the next token depends on whether the second identified token identified the type of the variable as integer or real. For variables of type real, the next recognized token is an integer representing the size of the fractional portion of the variable in bits; and (f) The next recognized token is a word beginning with two quote characters (ASCII character 0039) in a row, or the End Of Line (EOL) character "$". The quote character sequence identifies the beginning of a character string representing an inline comment. If the End of Line character is the next token, the definition of VRBL is complete. If the beginning of an inline comment was identified during the parsing of the VRBL declaration in the program, then all subsequent tokens are parsed and lexically added together (concatenated) until a token is found that ends with two quote characters in a row. This construct identifies the end of the definition of the inline comment and that the definition of the VRBL is complete.

Once the complete variable definition and inline comment has been extracted, the information is stored in the relational database 12 for subsequent use by the display functions.

For illustrative purposes, it can be assumed that the source code under analysis also uses the keyword "TABLE" to identify a complex data structure for processing. When the keyword "TABLE" is recognized, the program invokes the Process Table function 24 which in turn invokes a Process Field function. This portion of the extraction and conversion process reads the name and table top level data structure defined in the source code.

The process table function extracts the table name, type (horizontal or vertical), the number of items in the table, and the number of 32-bit words of memory to be allocated for the table. Additionally, if there is an inline comment on the table keyword, it is extracted as well.

Once the top level structure of the table has been extracted, the process table function invokes the process field function in order to extract the constituent field data structures used in the table. The data structure information extracted for each field includes field name, data type, size, sign, and position in the table (both word position and bit position).

An example table definition, complete with field definitions and inline comments is outlined below in Table II:

TABLE II

| CSTSEX H 7 MAXNTGSS |               | "CSTS EXTENSION                | "$ |
| ------------------- | ------------- | ------------------------------ | -- |
| FIELD RNGRATE       | A 16 S 8 0 31 | "RANGE RATE OF TGT IN YARDS/SECOND | "$ |
| FIELD TURNAMT       | A 16 S 15 0 15 | "TURN AMOUNT IN HAMS          | "$ |
| FIELD TURNAMTB      | A 16 U 16 0 15 | "TURN AMT IN BAMS             | "$ |
| FIELD EUA           | A 16 S 15 1 31 | "D/E ANGLE IN HAMS            | "$ |
| FIELD DE            | A 16 U 16 1 31 | "D/E ANGLE IN BAMS            | "$ |
| FIELD UCRR          | A 16 S 8 1 15  | "UNCORRECTED RNG-RATE         | "$ |
| FIELD DISPHIST      | B 2 0         | "WHEN SET, THIS TARGET HAS     | "$ |
|                     |               | " TRACK HISTORY DISPLAYED      | "$ |
| FIELD OPTURN        | B 2 1         | "OPERATOR SELECTED TURNRATE    |    |
|                     |               | 1 - YES 0 - NO (TRAINER ONLY)  | "$ |
| FIELD ZIGZAG        | B 2 2         | "TGT ZIGZAG MANEUVER IN EFFECT |    |

TABLE II-continued

| | | | | |
|---|---|---|---|---|
| FIELD PIDEQUL | B 2 3 | 1 - YES 0 - NO (TRAINER ONLY) "TGT IS PI/DE QUALIFIED | "$ |
| FIELD ASSB64 | B 2 4 | 1 - YES 0 - NO "TGT IS ASSIGNED TO B64 | "$ |
| FIELD PU | B 2 6 | 1 - YES 0 - NO " TGT IS A PARTICIPATING UNIT | |
| | | 1 = YES  0 = NO | "$ |
| | | 1 - YES  0 - NO | "$ |
| FIELD SODL | B 2 8 | " TGT IS A SODL TRACK | |
| | | 1 = YES  0 = NO | "$ |
| FIELD OTH | B 2 5 | "TGT IS OTH OR HAS GTE | "$ |
| FIELD OTBITS | I 4 U 2 8 | "OVERLAY FOR OTH BITS | "$ |
| FIELD SNORKEL | B 2 9 | "TGT SNORKEL STATUS (0) OFF, (1) ON | "$ |
| FIELD ACTAMP | B 2 10 | "TGT ACTIVE SONAR LEVEL(0) LOW, (1) HIGH | "$ |
| FIELD ACTSONAR | I 2 U 2 12 | "TGT ACTIVE SONAR MODE | "$ |
| FIELD B64INX | I 8 U 2 31 | "B64INTF1 TABLE INDEX FOR 21B64 INTERFACE | "$ |
| FIELD ORDCRS | A 32 S 31 3 31 | "ORDERED CRS HAMS | "$ |
| FIELD ORDCRSB | A 31 U 31 3 31 | "ORDERED CRS BAMS | "$ |
| FIELD ORDDEPTH | A 16 U 3 4 15 | "ORDERED DEPTH | "$ |
| FIELD ORDSPD | A 16 S 4 4 31 | "ORDERED SPEED | "$ |
| FIELD CRUMY | I 16 S  5 31 | "Y POSITION CRUMBS | "$ |
| FIELD CRUMX | I 16 S  5 15 | "X POSITION CRUMBS | "$ |
| FIELD TRNRATE | A 32 S 31 6 31 | "TURNRATE IN HAMS/SEC | "$ |
| FIELD TRNRATEB | A 31 U 31 6 31 | "TURNRATE IN BAMS/SEC | "$ |
| TABLE CSTSEX | | | $ |

The interpretation of the input computer code for tables is also based upon the fixed syntax of the language of the compiler. Preferably, the following constructs for tables are interpreted in this invention:

(a) The syntax of the compiler is such that the first token after the keyword "TABLE" is a character string identifying the table name (e.g. CSTSEX);

(b) The next token is a single character identifying the table type of the structure to be created (H=horizontal, V=vertical);

(c) The next token is a variable name or an integer that represents the table size of the data structure (in 32-bit words);

(d) The next token is a variable name or an integer that identifies the number of items in the table;

(e) The next recognized token is a word beginning with two quote characters (ASCII 0039) in a row, or the End Of Line (EOL) character "$". The quote character sequence identifies the beginning of a character string representing an inline comment. If the End of Line character is the next token, the definition of the table name and size is complete and the detailed description of the internal structure of the TABLE begins. If the beginning of an inline comments was identified during the parsing of the TABLE declaration in the program, then all subsequent tokens are parsed and lexically added together (concatenated) until a token is found that ends with two quote characters in a row. This construct identifies the end of the definition of the inline comment; and (f) The definition of the internal structure of the TABLE includes the definition of any number of fields within the table. The definition of the structure of each field is sequentially defined until the keyword "END-TABLE" is encountered. The "END-TABLE" keyword signifies the completion of the definition of the TABLE data structure.

The definition of the language syntax interpreted by the present invention for the constituent fields within a TABLE data structure may be specified as follows:

(1) The syntax of the compiler is such that the first token after the keyword FIELD is a character string identifying the field name (e.g. RNGRATE);

(2) The next token is a single character identifying the data type of the structure to be created (I=integer, A=real, B=boolean);

(3) The interpretation of the next token depends on whether the second identified token identified the variable as an integer, a real or a boolean data type.

(A) For integer and real data types;

(i) the next token is an integer that represents the field size of the structure in bits;

(ii) the next token is a single character that identifies the sign of the field (U=unsigned, S=signed);

(iii) the interpretation of the next token depends on whether the identified field is of the type integer or real. For fields of type real, the next recognized token is an integer representing the size of the fractional portion of the field in bits;

(iv) the next recognized token is an integer specifying the word position of the field within the table;

(v) the next recognized token is the bit position of the field within the previously identified word in the table;

(vi) the next recognized token is a word beginning with two quote characters (ASCII character 0039) in a row, or the End of Line (EOL) character "$". The quote character sequence identifies the beginning of a character string representing an inline comment. If the End of Line character is the next token, the definition of the field is complete. If the beginning of an inline comment was identified during the parsing of the FIELD declaration, then all subsequent tokens are parsed and lexically added together (concatenated) until a token is found that ends with two quote characters in a row. This construct identifies the end of the definition of the inline comment and that the definition of the field is complete.

(B) For boolean data types, (i) the next token is an integer representing the word position within the TABLE data structure of the boolean field;

(ii) the next token is an integer representing the bit position of the boolean field within the previously identified word in the TABLE data structure;

(iii) the next recognized token is a word beginning with two quote characters in a row (ASCII character 0039). This sequence identifies the beginning of a character string representing an inline comment;

(iv) the next recognized token is a word beginning with two quote characters (ASCII 0039) in a row, or the End Of Line (EOL) character "$". The quote character sequence identifies the beginning of a character string representing an inline comment. If the End Of Line character is the next token, the definition of the field is complete. If the beginning of an inline comment was identified during the parsing of the FIELD declaration in the program, then all subsequent tokens are parsed and lexically added together (concatenated) until a token is found that ends with two quote characters in a row. This construct identifies the end of the definition of the inline comment and that the definition of the field is complete.

The information produced during this extracting and converting step is then stored in a series of random access files in the relational database 12 for subsequent access by the display functions. Each file in the database can be kept on an individual disk if desired.

The C-Switch Processing Block may be used to identify structures containing the keywords "CSWITCH", "CSWITCH-ON", "CSWITCH-OFF", and "END-CSWITCH" or any other keywords used to identify sections of the source code to be switched on or off for conditional compilation. The four keywords mentioned above, when found in the source code, invoke process-cswitch, process-cswitchon, process-cswitchoff and process-cswitchend functions. These functions can be invoked at any time (even in the middle of a table definition) in response to encountering switches in the compiler. The functions add to the description of individual data structure records stored during the conversion process, the definition of the existence of cswitches and their status (ON or OFF).

As can be seen from the foregoing, the processing sections discussed above extract data structure information about variables, tables, fields in the tables, and comments about the foregoing located in the source code. The data structure information, as well as conversion status information, is stored during the extraction process in one or more random access files 12 for subsequent display processing. Preferably, the information is stored on off-line storage devices such as hard disks, floppy disks, tapes, and the like. This off-line storage approach represents a relational database. It has been found that this approach is desirable because it allows for the processing of very large source files (limited only by available disk space, not by available computer memory). This approach also eliminates the need to extract data structure information each time an analysis session is initiated.

In the database, a separate status file is maintained that identifies complete status information logged during the file extraction and conversion process. The detailed data structure information extracted by the process-variable, process-table and process-cswitch functions are preferably stored in four random access data files. They are the variables file, the tables file, the fields file and the comments file.

The status file is produced at the end of the conversion process and contains information concerning the number of extracted variables, tables, fields and comments. It contains the sizes of the files used and created, their file creation dates, and a list of the CSWITCHES found.

The variables file contains a number of fixed length records, each defining the content of the data extracted for the VRBL data type. Information stored in each record includes the variable name, data type, size, sign, data position, and cswitch status. Each of these records also contains pointer information to index into the comments file for any inline comments extracted for the variable.

The tables file contains a number of fixed length records, each defining the content of the data extracted for the TABLE data type. Information stored in each record includes the table name, type (horizontal or vertical), number of items, and length in 32-bit words. Each of these records also contains pointer information to index into the comments and fields files. The pointers for the comments file provides access to any inline comments extracted from the table definition. The pointers for the fields file allow for the access to the field data that comprise the table definition.

The fields file contains a number of fixed length records, each defining the content of the data extracted for the FIELD data subtype for the TABLE data structure. Information stored in each record includes the field name, data type, size, sign, data location (word and bit positions) and cswitch status. Each of these records also contains pointer information to index into the comments file for any inline comments extracted for the field.

The comments file contains a number of fixed length records, each defining the comment information extracted during variable, table and field processing. Access to the comments records is performed once the file indexing pointers have been obtained from the appropriate variable, table or field file record.

The software tool of the present invention also includes a display segment which provides textual and graphic displays of the extracted data structures. The display segment has a simple printing function embedded therein that provides printouts of the higher level information managed by the software. If desired, the display segment may also include an embedded function that provides visual display of a desired set of information on a monitor associated with the computer on which the analysis tool of the present invention is being run.

Figure 3:
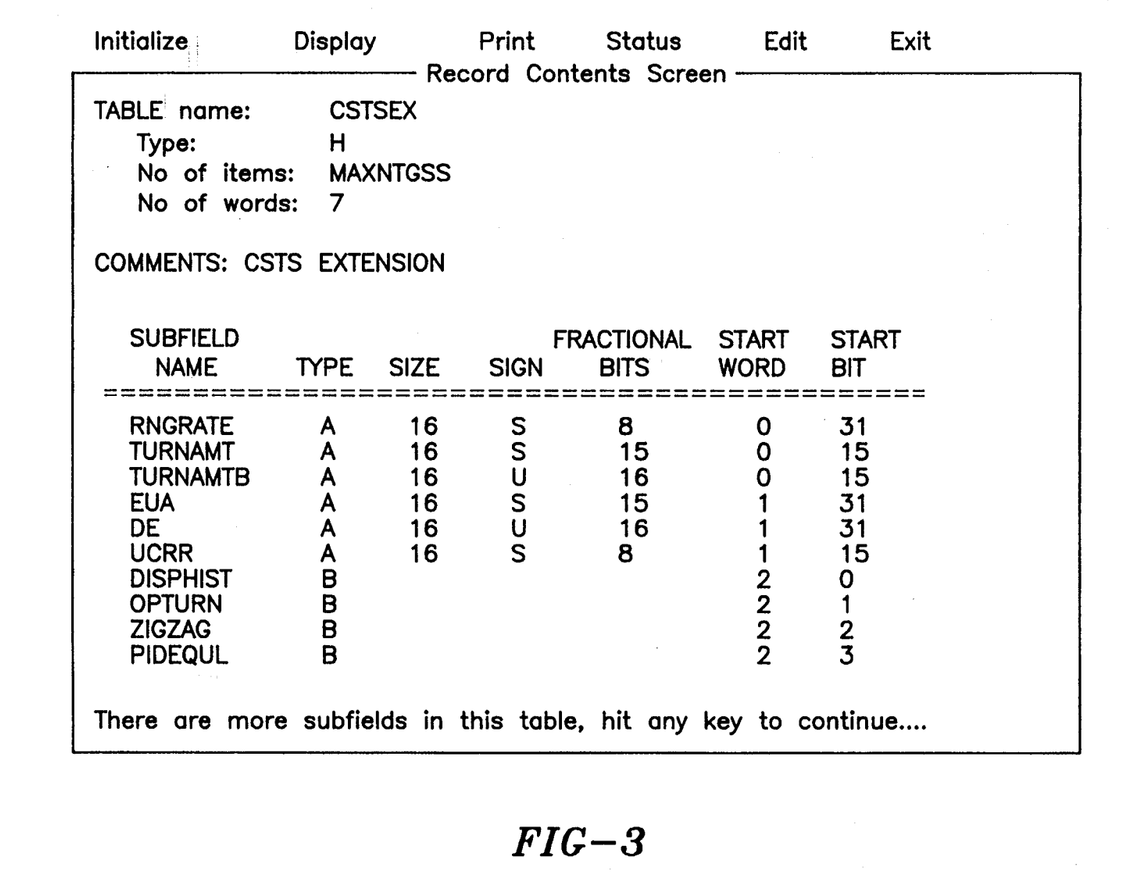
FIG. 3 is an illustration of a table display in text mode generated by the display segment of the program of the present invention.
Figure 4:
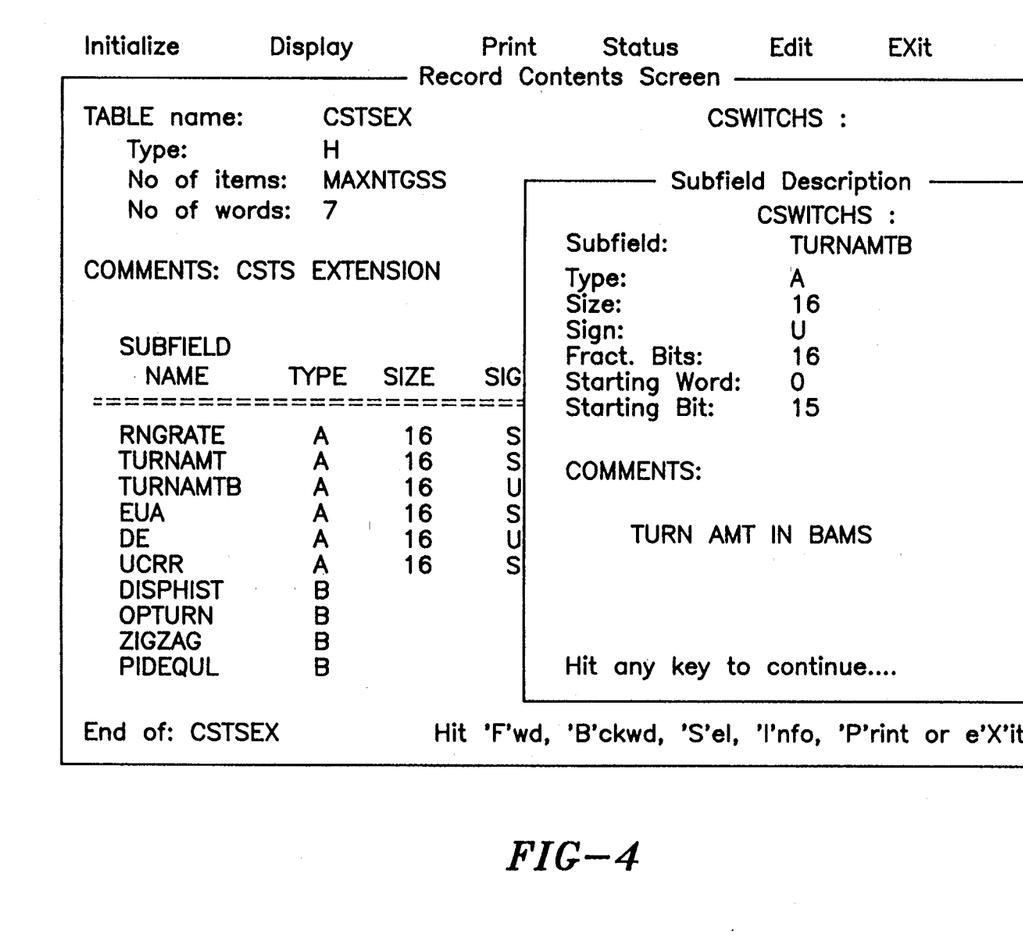
FIG. 4 is an illustration of a table display in text mode with subfield description generated by the display segment of the program of the present invention.

The textual display mode provides the capability to display the content of a selected data structure stored in the aforementioned files in text format. For table data structures, the individual fields within the table may also be shown (see FIGS. 3 and 4).

Figure 5:
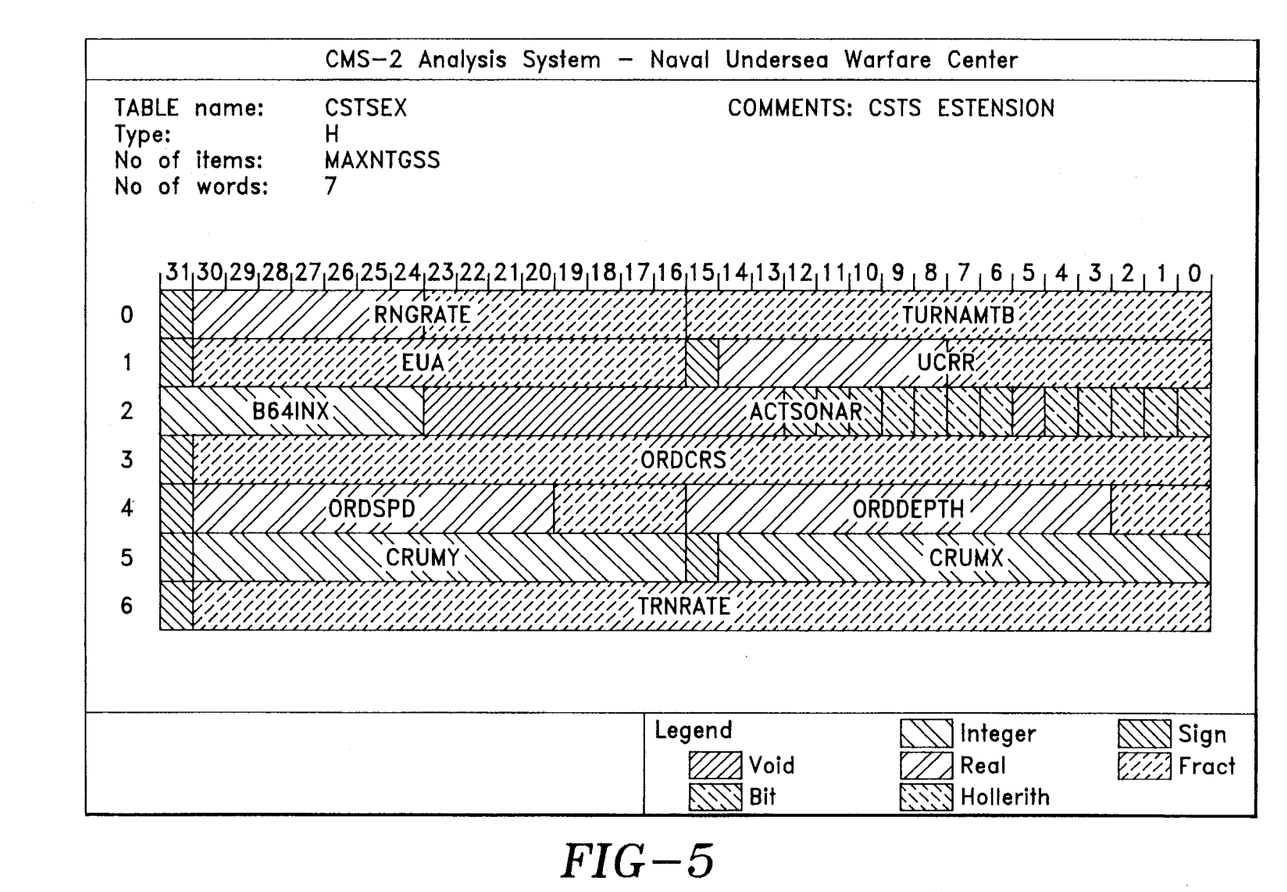
FIG. 5 is an illustration of a graphic display generated by the display segment of the program of the present invention.

The graphic display mode of the display segment may be used to provide a schematic representation of a selected data structure as it would be stored in the computer when the program is executed. As shown in FIG. 5, it provides for the display of the content, data type and location of each data structure and its constituent parts. The legend at the bottom of FIG. 5 illustrates the various types of information being displayed. With respect to "bit" information, the following code is applicable with respect to the CMS-2Y source code.

| WORD 2 (BIT FIELDS): | |
|---|---|
| BIT POSITION | FIELD NAME |
| 0 | DISPHIST |
| 1 | OPTURN |
| 2 | ZIGZAG |
| 3 | PIDEQUL |
| 4 | ASSB64 |
| 5 | (BLANK) |
| 6 | PU |
| 7 | STDL |
| 8 | SODL |
| 9 | SNORKEL |
| 10 | ACTAMP |

The menu system 16 provides the man-machine interface and acts as the binder for the other constituent functions. It may contain memubars, pop-up menus, pop-up windows and context sensitive help. It also includes a pop-up list feature which provides for display of lists of data and for user selection from the displayed lists.

The present invention is most advantageous in that it provides a data structure extraction, conversion and display capability that eliminates the labor intensive process of manually searching for data structure information, interpreting the information, and sketching the architecture of the data storage provided in the operational computer. The present invention facilitates the processing of very large quantities of computer software and the filtering out of data not pertinent to the data structure analysis task. The present invention also provides rapid viewing of data structures, reducing the time required to perform analyses. Still further, the graphic display of the data structures enabled by the present invention provides visualization of many software architecture attributes (table packing efficiency, multiple data references, etc.). The present invention also avoids documentation errors due to the extraction of data from the source code itself.

It is apparent that there has been provided in accordance with this invention a data, structure extraction, conversion and display tool which fully satisfies the objects, means, and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A computer-implemented method for analyzing a computer program, said method comprising the steps of:
   inputting a computer program having at least one source file to be analyzed into a computer;
   wherein the computer program to be analyzed is written in a programming language of the type which employs a fixed syntax of language constructs and includes compiler switching means which alternately switches on or off identified source code file sections;
   extracting and converting information about data structures within said program;
   said extracting and converting step comprising reading and parsing said at least one source code file to find at least one of a variable data structure and a table data while taking into account compiler switches;
   storing said information about said data structures in random access files;
   said reading and parsing step including identifying sections of said at least one source code file to be alternately switched on or off; and
   storing information about said sections including switch status information.

* * * * *